United States Patent
Horner et al.

(10) Patent No.: US 7,101,277 B2
(45) Date of Patent: Sep. 5, 2006

(54) CONTROL SYSTEM AND METHOD FOR CONTROLLING AIRCRAFT CABIN ALTITUDE DURING AIRCRAFT OPERATIONS ABOVE MAXIMUM CERTIFIED AIRCRAFT ALTITUDE

(75) Inventors: Darrell W. Horner, Oro Valley, AZ (US); Duane A. Inscho, Tucson, AZ (US)

(73) Assignee: Honeywell International, Inc., Morristown, NJ (US)

( * ) Notice: Subject to any disclaimer, the term of this patent is extended or adjusted under 35 U.S.C. 154(b) by 402 days.

(21) Appl. No.: 10/625,306

(22) Filed: Jul. 22, 2003

(65) Prior Publication Data

US 2005/0048901 A1    Mar. 3, 2005

(51) Int. Cl.
*B64D 13/04*    (2006.01)
(52) U.S. Cl. ....................................................... 454/74
(58) Field of Classification Search ................... 454/74, 454/71, 72; 73/1.64
See application file for complete search history.

(56) References Cited

U.S. PATENT DOCUMENTS

| | | | |
|---|---|---|---|
| 2,428,283 A | | 9/1947 | Kemper |
| 2,893,236 A * | | 7/1959 | Coon et al. .................. 73/1.64 |
| 2,973,702 A * | | 3/1961 | Andresen, Jr. ................ 454/71 |
| 2,983,211 A | | 5/1961 | Andresen, Jr. |
| 3,141,399 A | | 7/1964 | Andresen, Jr. |
| 3,376,803 A | | 4/1968 | Emmons |
| 3,485,161 A * | | 12/1969 | Kemper ........................ 454/74 |
| 3,706,270 A * | | 12/1972 | Furlong ........................ 454/72 |
| 4,164,898 A | | 8/1979 | Burgess et al. |
| 4,164,899 A | | 8/1979 | Burgess |
| 4,928,682 A * | | 5/1990 | Stevenson et al. ...... 128/202.26 |
| 5,150,317 A | | 9/1992 | Countryman |
| 5,186,681 A | | 2/1993 | Emmons |
| 5,273,486 A | | 12/1993 | Emmons et al. |
| 5,297,987 A | | 3/1994 | Emmons et al. |
| 5,520,578 A | | 5/1996 | Bloch et al. |
| 2002/0173263 A1 * | | 11/2002 | Petri et al. .................... 454/74 |

FOREIGN PATENT DOCUMENTS

DE            901 628 C        1/1954
WO  PCT/US2004/029249        6/2006

* cited by examiner

*Primary Examiner*—Harold Joyce
(74) *Attorney, Agent, or Firm*—Ingrassia Fisher & Lorenz

(57) ABSTRACT

A cabin pressure control system and method extends the cabin pressure control logic beyond the original maximum certified altitude of the aircraft, without having to update the control logic. Thus, the control system provides an independent means of limiting cabin-to-atmosphere differential pressure above the original maximum certified altitude if the aircraft exceeds, or is re-certified to exceed, its original maximum certified altitude.

22 Claims, 3 Drawing Sheets

CONTROL SYSTEM AND METHOD FOR CONTROLLING AIRCRAFT CABIN ALTITUDE DURING AIRCRAFT OPERATIONS ABOVE MAXIMUM CERTIFIED AIRCRAFT ALTITUDE

TECHNICAL FIELD

The present invention relates to aircraft cabin pressure control and, more particularly, to a system and method for controlling aircraft cabin pressure when the aircraft exceeds its original maximum certified altitude.

BACKGROUND

For a given airspeed, an aircraft may consume less fuel at a higher altitude than it does at a lower altitude. In other words, an aircraft may be more efficient in flight at higher altitudes as compared to lower altitudes. Moreover, bad weather and turbulence can sometimes be avoided by flying above such weather or turbulence. Thus, because of these and other potential advantages, many aircraft are designed to fly at relatively high altitudes. The altitude to which an aircraft may fly is, in many instances, limited to a maximum certified altitude.

As the altitude of an aircraft increases, from its take-off altitude to its "top of climb" or "cruise" altitude, the ambient atmospheric pressure outside of the aircraft decreases. Thus, unless otherwise controlled, air could leak out of the aircraft cabin causing it to decompress to an undesirably low pressure at high altitudes. If the pressure in the aircraft cabin is too low, the aircraft passengers may suffer hypoxia, which is a deficiency of oxygen concentration in human tissue. The response to hypoxia may vary from person to person, but its effects generally include drowsiness, mental fatigue, headache, nausea, euphoria, and diminished mental capacity.

Aircraft cabin pressure is often referred to in terms of "cabin pressure altitude," which refers to the normal atmospheric pressure existing at a certain altitude. Studies have shown that the symptoms of hypoxia may become noticeable when the cabin pressure altitude is above the equivalent of the atmospheric pressure one would experience outside at 8,000 feet. Thus, many aircraft are equipped with a cabin pressure control system functions to, among other things, maintain the cabin pressure altitude to within a relatively comfortable range (e.g., at or below approximately 8,000 feet), allow gradual changes in the cabin pressure altitude to minimize passenger discomfort, and maintain cabin-to-atmosphere differential pressure below nominal and maximum limits. Thus, many cabin pressure control systems control cabin altitude as a function of aircraft altitude, and do so in a manner and rate that will keep the cabin-to-atmosphere different pressure less than the nominal limit.

In addition to an automatic cabin pressure control system, many aircraft additionally include one or more pneumatically-operated positive differential pressure relief valves. These relief valves are provided to limit the cabin-to-atmosphere differential pressure independent of the cabin pressure control system in the unlikely, but postulated, event the cabin pressure control system is inoperable or malfunctions. The pressure relief valves are also useful in the event the aircraft exceeds its maximum certified altitude. This is because present cabin pressure control systems are limited to controlling cabin altitude to, for example, a maximum of 8,000 feet. For example, many cabin pressure control systems implement control logic that controls cabin altitude to a preset maximum altitude (e.g., 8,000 feet) when the aircraft is at its maximum certified altitude. Hence, if the aircraft were to exceed its certified altitude due, for example, to turbulence, the cabin pressure control system would continue controlling, or attempting to control, cabin pressure to the preset maximum altitude, while the positive pressure relief valves prevent the differential pressure limit from being exceeded.

Some aircraft certification authority regulations indicate that certain aircraft should have two independent means to limit cabin-to-atmosphere differential pressure. In some aircraft configurations, this regulation is implemented by providing two independent pneumatic positive pressure relief valves. In other aircraft configuration, this regulation is implemented by including one pneumatic positive pressure relief valve, and relying on the cabin pressure control system as the second means of limiting cabin-to-atmosphere differential pressure. In this latter aircraft configuration, if the aircraft exceeds its maximum certified altitude, then only one independent means of providing positive differential pressure relief is available, since the cabin pressure control system, as was noted above, will be controlling cabin pressure to the preset maximum altitude. Thus, the certification authority regulations are not met.

In addition to short excursions above the maximum certified altitude due to turbulence, there are various other reasons why an aircraft may exceed its initially certified maximum altitude. For example, an updated version of an aircraft that was originally designed as a high frequency regional/commuter type of aircraft may be marketed and sold as an executive aircraft, which is operated at a lower frequency. The high frequency commuter aircraft would likely have a lower maximum certified altitude and lower cabin-to-atmosphere differential pressure limit, than would the low frequency executive aircraft. Other examples in which an aircraft may exceed its original maximum certified altitude include certain military aircraft, aircraft used by NASA, aircraft used for weather services, or aircraft used for other special purpose missions. In each of these cases, once the aircraft is re-certified to the higher maximum altitude, either the cabin pressure control system logic would need to be reconfigured to the new differential pressure limit, or a second positive pressure relief valve would need to be installed to meet the above-mentioned certification authority regulations.

Present cabin pressure control systems that are used in conjunction with a single, independent positive pressure relief valve to limit cabin-to-ambient differential pressure are robustly designed and manufactured, and are operationally safe. Nonetheless, as noted above, these systems suffer certain drawbacks. For example, these systems are not configured to provide an independent means of positive pressure relief if the aircraft exceeds, or is recertified to exceed, its original certified maximum altitude. Thus, the control logic should be updated, which can increase costs, or a second positive pressure relief valve should be added, which can increase costs, weight, and result in another opening in the aircraft fuselage.

Hence, there is a need for a cabin pressure control system and method that extends the cabin pressure control logic beyond the original maximum certified altitude of the aircraft, without having to update the control logic. In doing so, the control system will provides an independent means of limiting cabin-to-atmosphere differential pressure above the original maximum certified altitude, thereby alleviating the need to add an additional positive pressure relief valve, which can reduce aircraft cost, and/or weight, and/or number of fuselage openings. The present invention addresses one or more of these needs.

BRIEF SUMMARY

The present invention provides a cabin pressure control system and method that extends the cabin pressure control logic beyond the original maximum certified altitude of the aircraft, without having to update the control logic, so that the control system provides an independent means of limiting cabin-to-atmosphere differential pressure above the original maximum certified altitude.

In one embodiment, and by way of example only, a method of controlling aircraft cabin altitude in an aircraft certified to fly to a maximum certified altitude, and having at least a maximum cabin-to-atmosphere differential pressure limit, when the aircraft exceeds the maximum certified flight altitude includes determining that the aircraft has exceeded the maximum certified altitude. Cabin altitude is automatically controlled based at least in part on aircraft altitude, such that the maximum cabin-to-atmosphere differential pressure limit is not exceeded.

In another exemplary embodiment, an aircraft cabin pressure control system for an aircraft having at least a nominal cabin-to-atmosphere differential pressure limit and a maximum cabin-to-atmosphere differential pressure limit includes a controller and an outflow valve. The controller is adapted to receive a signal representative of aircraft altitude and is operable, in response thereto, to supply valve command signals. The outflow valve is coupled to receive the valve command signals from the controller and is operable, in response thereto, to selectively move between an open and a closed position. The supplied valve command signals selectively move the outflow valve between the open and closed positions to thereby control aircraft cabin altitude, such that (i) the nominal cabin-to-atmosphere differential pressure limit is not exceeded when the signal representative of aircraft altitude indicates aircraft altitude is at or below the maximum certified altitude, and (ii) the maximum cabin-to-atmosphere differential pressure limit is not exceeded when the signal representative of aircraft altitude indicates aircraft altitude exceeds the maximum certified altitude by a first predetermined magnitude.

Other independent features and advantages of the preferred cabin pressure control system and method will become apparent from the following detailed description, taken in conjunction with the accompanying drawings which illustrate, by way of example, the principles of the invention.

DETAILED DESCRIPTION OF A PREFERRED EMBODIMENT

Figure 1:
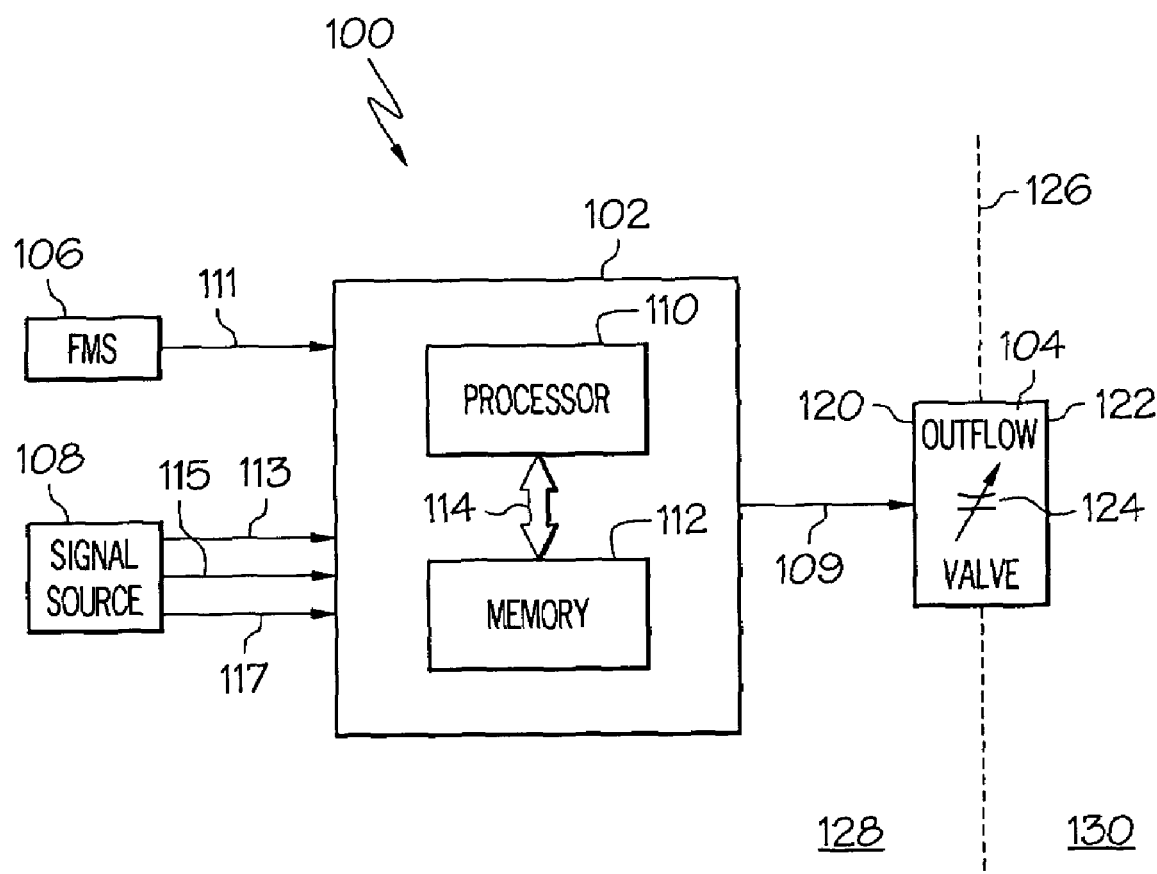
FIG. 1 is a functional block diagram of a cabin pressure control system according to an embodiment of the present invention.

A cabin pressure control system according to an exemplary embodiment is illustrated in FIG. 1. The system 100 includes a controller 102 and an outflow valve 104. In the depicted embodiment, the controller 102 is adapted to receive one or more signals from the aircraft's flight management system (FMS) 106, and signals from a signal source 108, which may include various sensors and/or the aircraft avionics equipment. In addition, it will be appreciated that one or more portions of the signal source 108 may be included within the controller 102. It will additionally be appreciated that the system 100 may be configured such that signals are not supplied from the FMS 106 to the controller 102.

In the depicted embodiment, in which signals are supplied to the controller 102 from the FMS 106, these signals include, for example, a signal representative of the aircraft's "top-of-climb" or cruise altitude 111. The signals from the signal source 108 include, for example, one or more signals representative of actual aircraft altitude 113, and one or more signals representative of actual cabin altitude 115. As will be described in more detail below, the controller 102 uses these signals to implement a control logic scheme, and to supply valve command signals 109 to the outflow valve 104. The position of the outflow valve 104 varies in response to the valve command signals to thereby control aircraft cabin altitude and aircraft cabin altitude rate of change.

The controller 102 includes at least a processor 110, and a memory circuit 112, which are preferably interconnected via a communication bus 114. The processor 110 receives and processes the signals supplied to the controller 102 from the FMS 106 and the signal source 108. In particular, the processor 110 receives at least the aircraft cruise altitude signal 111 from the FMS 106, and the actual aircraft altitude signal 113 and the actual cabin altitude signal 115 from the signal source 108. The processor 110 also processes data representative of a nominal cabin-to-atmosphere differential pressure limit ($\Delta P_{nom}$), a maximum cabin-to-atmosphere differential pressure limit ($\Delta P_{max}$) for the aircraft, and an intermediate cabin-to-atmosphere differential pressure limit ($\Delta P_{int}$), which is a value having a magnitude between the nominal and maximum differential pressure limits. These data may be supplied from the FMS 106, the signal source 108, from an on-board memory (not illustrated), or from the memory circuit 112. In a particular preferred embodiment, these data are stored in, and supplied from, the memory circuit 112. The processor 110, implementing the above-mentioned control logic, processes the received signals and data, and supplies the valve command signals 109 to the outflow valve 104. The control logic, which is preferably implemented in software and stored in the memory circuit 112, will be described in more detail below. It will be appreciated that the processor 102 is additionally configured to determine actual cabin-to-atmosphere differential pressure ($\Delta P_{act}$) from one or more of the received signals.

The valve command signals 109 may be supplied directly to the outflow valve 104 or via valve driver circuitry (not illustrated). It will be appreciated that the valve driver circuitry, if included, may be part of the controller 102 or incorporated into the outflow valve 104. It will be additionally be appreciated that although the processor 110 and memory circuit 112 are depicted as separate units, the memory circuit 112 could be integral to the processor 110. The individual depiction of each is provided solely for additional clarity and ease of description.

Though not depicted, it will be appreciated that the controller could additionally include one or more signal conditioning circuits at either, or both, the input and the output of the controller 102. The signal conditioning circuits, if included, would function to, among other things, appropriately condition the signals received by each circuit. For example, if one or more of the signals supplied to the controller are analog signals, an input signal conditioning circuit would include analog-to-digital signal (A/D) conversion circuitry. Similarly, if the command signals 109 supplied to the outflow valve 104 need to be analog signals, an output signal conditioning circuit would include digital-to-analog (D/A) conversion. It will additionally be appreciated that the processor 110 could be configured with on-board signal processing circuitry.

The outflow valve 104 includes an inlet flow port 120, an outlet flow port 122, and a variable area flow orifice 124 located therebetween to regulate fluid flow. The outflow valve 104 is, for example, preferably mounted on an aircraft bulkhead 126 such that the inlet flow port 120 is exposed to the aircraft cabin 128 and the outlet flow port 122 is exposed to the atmosphere outside of the aircraft 130. Thus, during flight the pressure in the aircraft cabin 128 (e.g., cabin altitude), and the rate of change of aircraft cabin altitude, can be controlled by moving the outflow valve variable area flow orifice 124.

Figure 2:
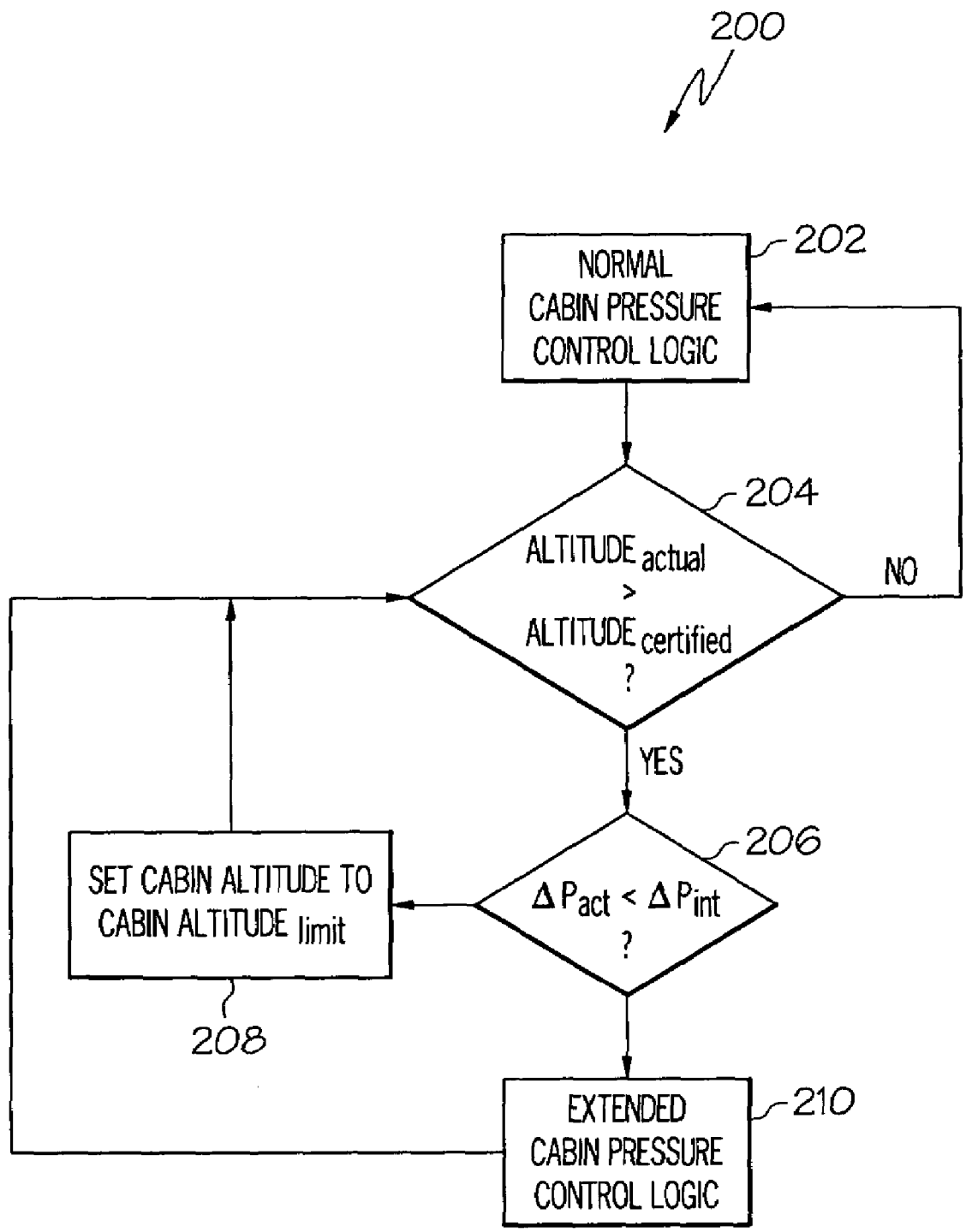
FIG. 2 is a flowchart of an exemplary embodiment of the control logic that may be implemented by the cabin pressure control system of FIG. 1.

The controller 102, as was noted above, implements software control logic to supply the valve command signals 109 to the outflow valve 104, to thereby control aircraft cabin altitude. An exemplary embodiment of at least a portion of this software control logic will be now described in more detail. In doing so, reference should be made to FIG. 2, which depicts an exemplary embodiment of the control logic in flowchart form. It should be appreciated that the parenthetical references in the following discussion correspond to the flowchart blocks shown in FIG. 2.

The processor 110 initially implements what is referred to herein as a "normal" cabin pressure control logic (202). The normal cabin pressure control logic (202) may be any one of numerous types of cabin pressure control logic including, but not limited to, adaptive control logic, reactive control logic, or fixed-rate control logic. No matter which specific control logic type is implemented, the cabin pressure control system 100 will increase the cabin altitude as the aircraft ascends to its cruise altitude, while maintaining the actual cabin-to-atmosphere differential pressure less than or equal to the nominal cabin-to-atmosphere differential pressure limit and limiting cabin altitude rate of change within a substantially comfortable range.

As was previously mentioned, many normal cabin pressure control logics (202), including at least the adaptive control logic, the reactive control logic, and various fixed-rate control logics, increase cabin altitude as a function of aircraft altitude. To do so, many normal cabin pressure control logics (202) use one or more cabin altitude versus aircraft altitude schedules, which end at the maximum certified altitude of the aircraft. If the normal cabin pressure control logic (202) does not use one or more schedules, the logic implements some type of limiter function at the maximum certified altitude. Accordingly, the normal cabin pressure control logic (202), no matter the specific type being implemented, includes a cabin altitude limit (CABIN ALTITUDE$_{limit}$).

While implementing the normal control logic (202), the actual aircraft altitude (ALTITUDE$_{actual}$) is compared to the maximum certified altitude (ALTITUDE$_{certified}$) of the aircraft (204). If the actual aircraft altitude is at or below the maximum certified altitude, then the processor 110 continues implementing the normal control logic (202). However, if the actual aircraft altitude is above the maximum certified altitude, then the actual and intermediate cabin-to-atmosphere differential pressure limits are compared (206). If the actual cabin-to-atmosphere differential pressure is less than the intermediate cabin-to-atmosphere differential pressure limit, then the cabin pressure control system 100 maintains the cabin altitude at the cabin altitude limit (208) until the actual aircraft altitude falls below the maximum certified altitude.

If the actual cabin-to-atmosphere differential pressure reaches the intermediate cabin-to-atmosphere differential pressure limit, then the processor 110 implements what is referred to herein as an "extended" cabin pressure control logic (210). With the extended cabin pressure control logic (210), the cabin pressure control system 100, similar to the normal pressure control logic (202), increases the cabin altitude as a function of aircraft altitude. However, rather than maintaining the actual cabin-to-atmosphere differential pressure less than or equal to the nominal cabin-to-atmosphere differential pressure limit, the extended pressure control logic (210) maintains the actual cabin-to-atmosphere differential pressure less than or equal to the intermediate cabin-to-atmosphere differential pressure limit. In a particular preferred embodiment, the intermediate cabin-to-atmosphere differential pressure limit is a fixed value. However, it will be appreciated that this value could also be a variable that the processor 110 (or other circuit) determines based on one or more signals and/or data.

The extended cabin pressure control logic (210), similar to the normal cabin pressure control logic (202), preferably includes a cabin altitude rate limit. This rate limit is preferably of a magnitude that is great enough to handle a vast majority of aircraft climb rate profiles. In addition, the extended cabin pressure control logic (210), like the normal cabin pressure control logic (202), may be adaptive control logic, reactive control logic, or fixed-rate control logic, and may additionally include one or more cabin altitude versus aircraft altitude schedules.

The processor 110 will continue implementing extended cabin pressure control logic (210) until the actual aircraft altitude goes below the maximum certified altitude. It will be appreciated that the processor 110 does not begin implementing the extended cabin pressure control logic (210) until actual cabin-to-atmosphere differential pressure reaches the intermediate cabin-to-atmosphere differential pressure limit so that normal aircraft altitude variations can accounted for without causing cabin altitude fluctuations.

Figure 3:
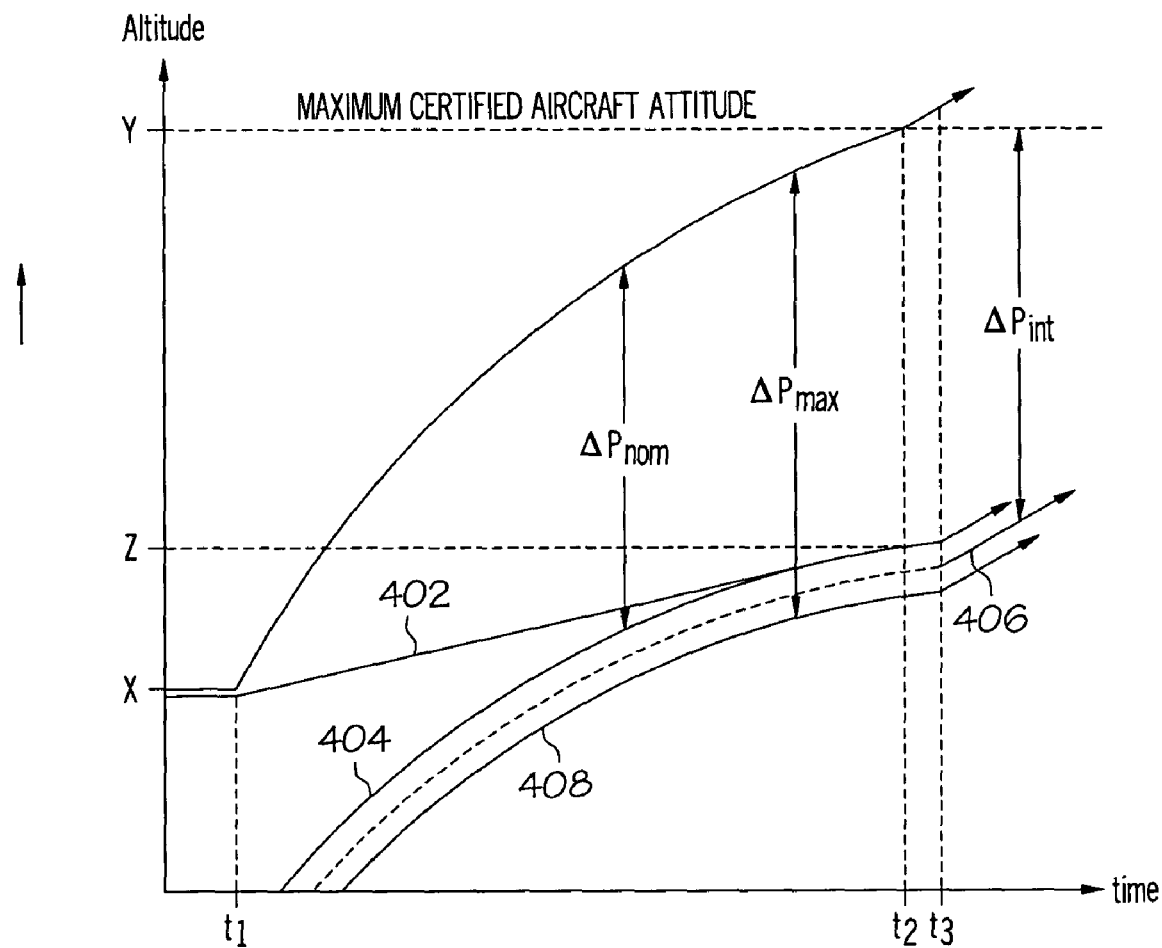
FIG. 3 is graph of aircraft and cabin altitude versus time of an exemplary aircraft climb to, and excursion above, the maximum certified aircraft altitude when the control logic illustrated in FIG. 2 is implemented.

Having described the cabin pressure control system 100 and the control logic 200 it implements, a description of cabin pressure control system operation during an exemplary aircraft ascent to, and excursion above, the certified aircraft altitude will now be provided. In doing so, reference should now be made to FIG. 3, which shows a graph of aircraft and cabin altitude versus time during the ascent and excursion. It will be appreciated that in the depicted embodiment, the normal control logic (202) that is implemented by the cabin pressure control system 100 is a fixed-rate logic that includes a limiter function at the maximum certified altitude of the aircraft. It will be appreciated that adaptive or reactive control logic, as was noted above, could also be used.

The aircraft is initially on the ground at its take-off location, or "take-off field," which is at an altitude relative to sea level. In the depicted example, the take-off field is "X" number of feet above sea level. Prior to take-off, the flight crew enters, among other data, the cruise altitude the aircraft will be ascending to for the flight into the FMS 106. In the depicted example, the cruise altitude is "Y" number of feet above sea level, which corresponds to the maximum certified altitude. In accordance with the fixed-rate control logic of the depicted embodiment, the cabin pressure control system 100 determines the desired cabin altitude at this cruise altitude. In the depicted example, the desired cabin altitude is "Z" number of feet above sea level. Thereafter, at some point in time ($t_1$), the aircraft takes off from the take-off field and begins its ascent toward its final cruise altitude.

As the aircraft ascends toward its cruise altitude, as illustrated by curve 402, the cabin pressure control system 100 controls cabin altitude such that it is maintained above curve 404, 406, and 408, which represent the nominal, intermediate, and maximum cabin-to-ambient differential pressure limits, respectively, for the depicted flight profile of the aircraft. The cabin pressure control system 100 additionally controls cabin altitude such that cabin altitude increases at a fixed rate of change until the desired cabin altitude is reached. In the depicted example, the desired cabin altitude is reached at time ($t_2$), which is the same time that the aircraft reaches its cruise altitude. It will be appreciated that if the aircraft ascended at a greater or lesser rate than that depicted in FIG. 4, and reached its cruise altitude before or after time ($t_2$), that the cabin pressure control system 100 would still control cabin altitude rate of change at a fixed value. Thus, the desired cabin altitude would still be reached at time ($t_2$).

At time ($t_2$), the aircraft ascends beyond the maximum certified altitude, and cabin-to-atmosphere differential pressure begins increasing. However, cabin-to-atmosphere differential pressure is below the intermediate cabin-to-atmosphere differential pressure limit, thus the cabin pressure control system 100 maintains the cabin altitude at the same cabin altitude (e.g., "Z" number of feet above sea level). Thereafter, at time ($t_3$), cabin-to-atmosphere differential pressure increases to the intermediate cabin-to-atmosphere differential pressure limit, and the processor 110 implements the extended cabin pressure control logic. Thus, the cabin pressure control system 100 once again controls cabin altitude as a function of aircraft altitude.

The cabin pressure control system and method disclosed herein extends the cabin pressure control logic beyond the original maximum certified altitude of the aircraft, without having to update the control logic. Thus, the control system provides an independent means of limiting cabin-to-atmosphere differential pressure above the original maximum certified altitude if the aircraft exceeds, or is re-certified to exceed, its original maximum certified altitude. Thus, the need to add an additional positive pressure relief valve is alleviated, which can reduce aircraft cost, and/or weight, and/or number of fuselage openings.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. In an aircraft certified to fly to a maximum certified altitude, and having at least a maximum cabin-to-atmosphere differential pressure limit, a method of controlling aircraft cabin altitude when the aircraft exceeds the maximum certified flight altitude, the method comprising the steps of:
    determining that the aircraft has exceeded the maximum certified altitude; and
    automatically controlling cabin altitude based at least in part on aircraft altitude, such that the maximum cabin-to-atmosphere differential pressure limit is not exceeded.

2. The method of claim 1, wherein the aircraft additionally has a nominal cabin-to-atmosphere differential pressure limit, and wherein the method further comprises the step of:
    determining that cabin-to-atmosphere differential pressure has exceeded the nominal cabin-to-atmosphere differential pressure limit by a predetermined magnitude.

3. The method of claim 1, wherein the step of automatically controlling further comprises:
    automatically controlling cabin altitude as a function of aircraft altitude and cabin-to-atmosphere differential pressure, such that cabin-to-atmosphere differential pressure is substantially controlled to at least a predetermined differential pressure value that is less than the maximum cabin-to-atmosphere differential pressure limit.

4. The method of claim 3, wherein the predetermined magnitude varies with aircraft altitude above the certified aircraft altitude.

5. The method of claim 3, wherein:
    the aircraft additionally has a nominal cabin-to-atmosphere differential pressure limit; and
    the predetermined magnitude is greater than the nominal cabin-to-atmosphere differential pressure limit.

6. The method of claim 1, further comprising:
    determining a scheduled cabin altitude base at least in part on the determined aircraft altitude; and
    automatically controlling aircraft cabin altitude based on the scheduled cabin altitude.

7. The method of claim 6, wherein the scheduled cabin altitude is one of a reactive scheduled cabin altitude and an adaptive scheduled cabin altitude.

8. In an aircraft certified to fly to a maximum certified flight altitude, and having at least a nominal and a maximum cabin-to-atmosphere differential pressure limit, a method of controlling aircraft cabin altitude, comprising the steps of:
    determining aircraft altitude; and
    automatically controlling cabin altitude based at least in part on aircraft altitude and cabin-to-atmosphere differential pressure, such that:
        (i) the nominal cabin-to-atmosphere differential pressure limit is not exceeded when the determined aircraft altitude is at or below the maximum certified altitude, and
        (ii) the maximum cabin-to-atmosphere differential pressure limit is not exceeded when the determined aircraft altitude exceeds the maximum certified altitude by a first predetermined magnitude.

9. The method of claim 1, wherein:
    when the determined aircraft altitude exceeds the maximum certified flight altitude by the first predetermined magnitude, the cabin altitude is automatically controlled, such that actual cabin-to-atmosphere differential pressure is substantially controlled to at least a second predetermined magnitude less than the maximum cabin-to-atmosphere differential pressure limit.

10. The method of claim 9, wherein the second predetermined magnitude varies with aircraft altitude above the certified aircraft altitude.

11. The method of claim 9, wherein the second predetermined magnitude is greater than the nominal cabin-to-atmosphere differential pressure limit.

12. The method of claim 8, wherein the cabin altitude is automatically controlled as a function of aircraft altitude.

13. The method of claim 8, further comprising:
determining a scheduled cabin altitude based at least in part on the determined aircraft altitude; and
automatically controlling aircraft cabin altitude based on the scheduled cabin altitude.

14. The method of claim 13, wherein the scheduled cabin altitude is one of a reactive scheduled cabin altitude and an adaptive scheduled cabin altitude.

15. An aircraft cabin pressure control system for an aircraft having at least a nominal cabin-to-atmosphere differential pressure limit and a maximum cabin-to-atmosphere differential pressure limit, the system comprising:
a controller adapted to receive a signal representative of aircraft altitude and operable, in response thereto, to supply valve command signals; and
an outflow valve coupled to receive the valve command signals from the controller and operable, in response thereto, to selectively move between an open and a closed position,
wherein the supplied valve command signals selectively move the outflow valve between the open and closed positions to thereby control aircraft cabin altitude, such that:
(i) the nominal cabin-to-atmosphere differential pressure limit is not exceeded when the signal representative of aircraft altitude indicates aircraft altitude is at or below the maximum certified altitude, and
(ii) the maximum cabin-to-atmosphere differential pressure limit is not exceeded when the signal representative of aircraft altitude indicates aircraft altitude exceeds the maximum certified altitude by a first predetermined magnitude.

16. The system of claim 15, further comprising:
a first sensor operable to sense actual aircraft altitude and supply the signal representative thereof to the controller.

17. The system of claim 15, wherein:
when the aircraft altitude exceeds the maximum certified flight altitude by the first predetermined magnitude, the supplied valve command signals selectively move the outflow valve between the open and closed positions to thereby control aircraft cabin altitude such that actual cabin-to-atmosphere differential pressure is substantially controlled to at least a second predetermined magnitude less than the maximum cabin-to-atmosphere differential pressure limit.

18. The system of claim 17, wherein the second predetermined magnitude varies with aircraft altitude above the certified aircraft altitude.

19. The system of claim 17, wherein the second predetermined magnitude is greater than the nominal cabin-to-atmosphere differential pressure limit.

20. The system of claim 15, wherein:
the controller is further operable to determine a scheduled cabin altitude based at least in part on the signal representative of aircraft altitude,
wherein the supplied valve command signals selectively move the outflow valve between the open and closed positions to thereby control aircraft cabin altitude in accordance with the scheduled cabin altitude.

21. The system of claim 20, wherein the scheduled cabin altitude is one of a reactive scheduled cabin altitude and an adaptive scheduled cabin altitude.

22. The system of claim 20, further comprising:
a memory having the scheduled cabin altitude stored therein.

* * * * *